June 22, 1943.  P. F. SPERRY  2,322,400
FILM MAGAZINE POSITIONING AND EJECTING MECHANISM
Filed Nov. 3, 1941  4 Sheets-Sheet 1
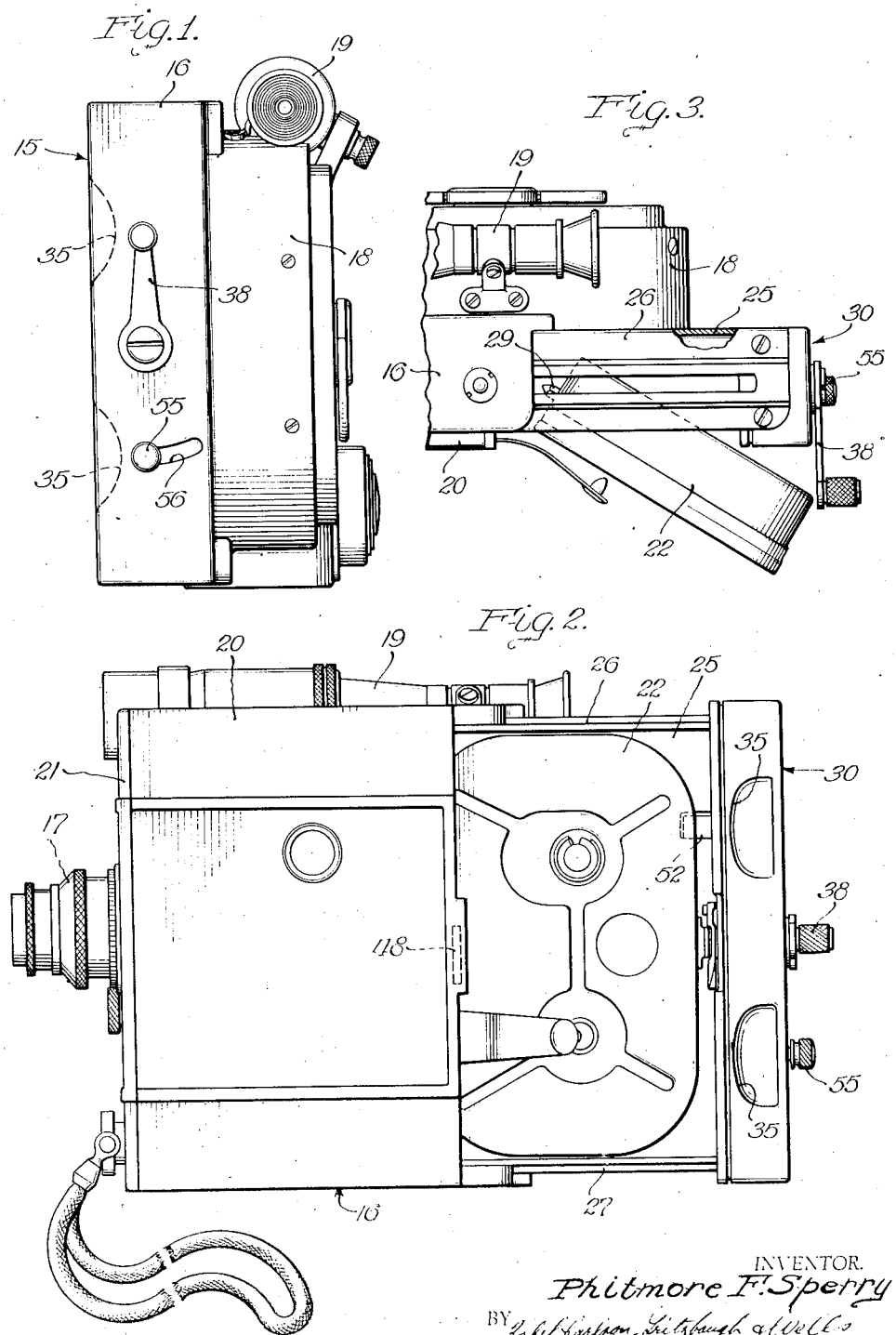
INVENTOR.
Philmore F. Sperry June 22, 1943.   P. F. SPERRY   2,322,400
FILM MAGAZINE POSITIONING AND EJECTING MECHANISM
Filed Nov. 3, 1941   4 Sheets-Sheet 2

INVENTOR.
Philmore F. Sperry
BY *Jabel Carlson Griftaugh & Wells*
Attys.

June 22, 1943.  P. F. SPERRY  2,322,400
FILM MAGAZINE POSITIONING AND EJECTING MECHANISM
Filed Nov. 3, 1941  4 Sheets-Sheet 3
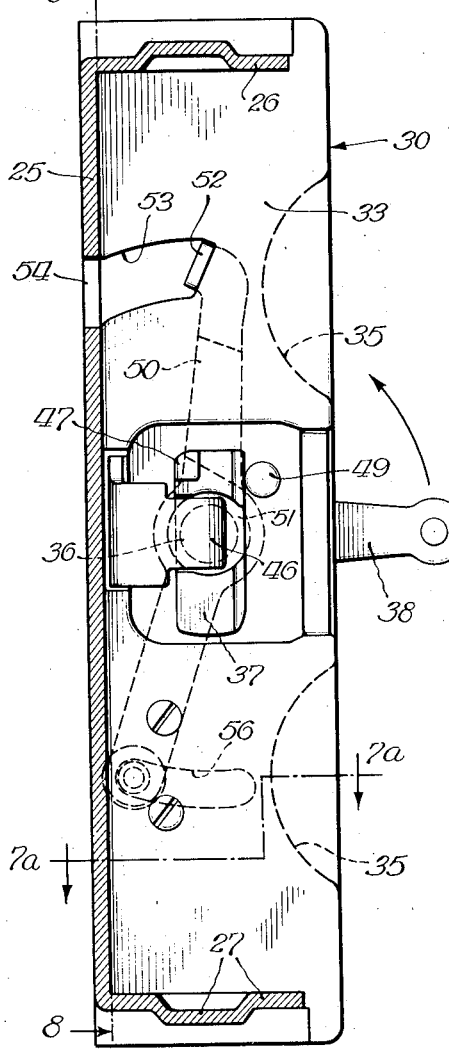
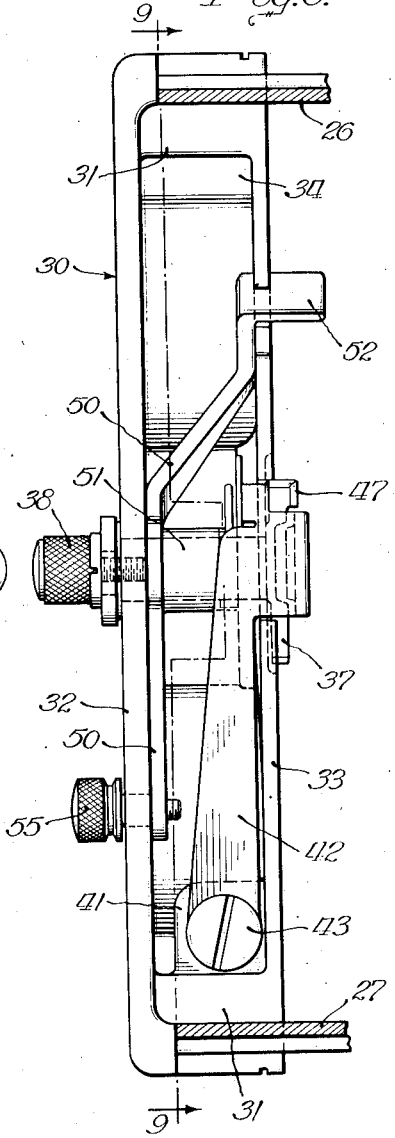
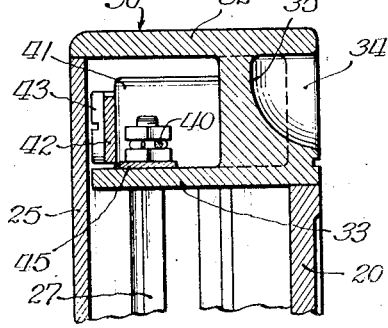
INVENTOR.
Philmore F. Sperry June 22, 1943. P. F. SPERRY 2,322,400
FILM MAGAZINE POSITIONING AND EJECTING MECHANISM
Filed Nov. 3, 1941 4 Sheets-Sheet 4
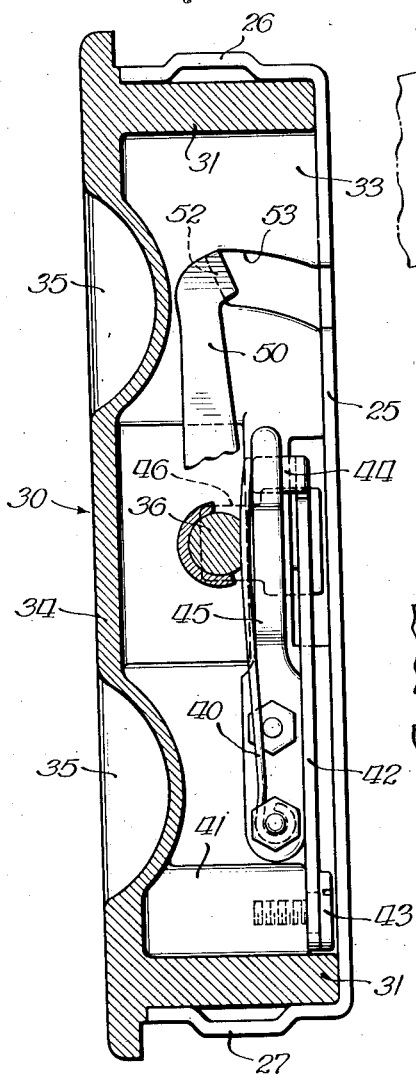
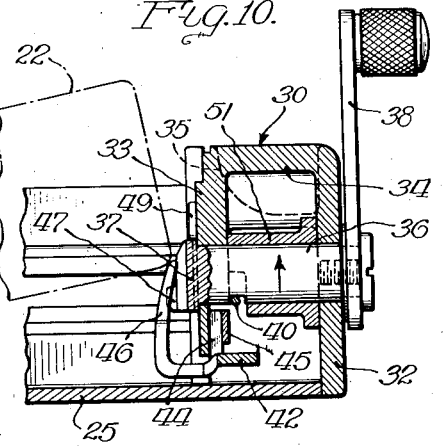
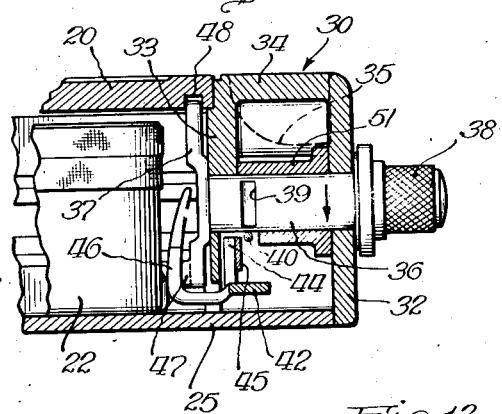
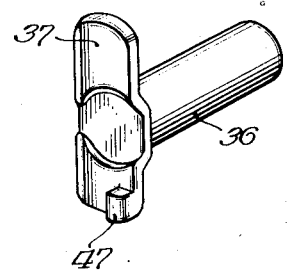
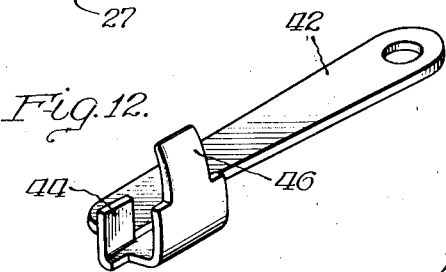
INVENTOR.
Philmore F. Sperry Patented June 22, 1943

2,322,400

UNITED STATES PATENT OFFICE 2,322,400

FILM MAGAZINE POSITIONING AND EJECTING MECHANISM

Philmore F. Sperry, Chicago, Ill.; Helen B. Sperry, executrix of the estate of said Sperry, deceased, assignor, by mesne assignments, to Theodore H. Briskin, Philip F. Briskin, and Jack Briskin Application November 3, 1941, Serial No. 417,648

20 Claims. (Cl. 88—17)

This invention relates to film magazine positioning and ejecting mechanism for cameras of the type shown and claimed by my co-pending application Ser. No. 416,056, filed October 22, 1941. It is the principal object of the present invention to provide a new and improved form and arrangement of parts in a mechanism of this type for releasably locking the film magazine and the slidably mounted carrier in which the film magazine is mounted in their alternative open and closed positions.

For attaining the several objects of the invention, the carrier, which in the arrangement shown is in the form of a drawer adapted to receive a film magazine into position thereon so as to be gripped and partially enclosed thereby, and is provided with an arrangement of spring means by which the magazine is pressed forwardly on the carrier when applied thereon, and with a locking head which can be turned into operative position for pressing the film magazine positively forwardly in the carrier and for locking the carrier positively against withdrawal from the magazine chamber of the camera. The parts provided for accomplishing these several objects are all arranged in compact form with respect to each other in a comparatively very small chamber portion of the carrier at its rear edge. It has been found in practice that the improved arrangement works satisfactorily in spite of the limited space within which it is positioned and is of ample strength so as to be adapted to stand up acceptably in long continued use.

It is another object of the invention to improve mechanisms of this type in sundry details hereinafter pointed out. The preferred means by which the several objects have been attained are illustrated in the accompanying drawings, in which—

Fig. 1 is a rear face view of a camera equipped with the improvements forming the subject matter of this invention;

Fig. 2 is a side face view of the camera as seen from the left in Fig. 1 but with the film magazine and the carrier by which the magazine is releasably gripped moved outwardly to the loading position;

Fig. 3 is a top plan view of a portion of the parts as shown in Fig. 2 but with certain of the parts in changed position;

Fig. 7 is a transverse vertical sectional view looking backwardly toward the rear face portion of the magazine carrier, being taken substantially at the line 7—7 of Fig. 4;

Fig. 7a is a horizontal sectional view taken substantially at the line 7a—7a of Fig. 7;

Fig. 8 is a longitudinal vertical sectional view through a fragmentary portion of the magazine carrier at the rear edge thereof, being taken substantially at the line 8—8 of Fig. 7;

Fig. 9 is a transverse vertical sectional view looking forwardly toward the front of the magazine carrier, being taken substantially at the line 9—9 of Fig. 8;

Fig. 10 is a horizontal sectional view taken substantially at the line 10—10 of Fig. 4, with the film carrier in its outer opened position, and with a diagrammatic showing of a film magazine in a preliminary insertion position;

Fig. 11 is a view similar to Fig. 10 but with the magazine carrier in its inner closed position with a film magazine therein, and with the carrier locked in position by engagement with the side face plate of the camera;

Fig. 12 is a perspective view of a pivotally mounted arm which engages the film magazine for pressing it forwardly to its operative position; and Fig. 13 is a perspective view of a rotatably mounted crosshead which serves to lock the magazine carrier releasably in its operative position and to hold the film magazine in its forward operative position on the carrier.

Figure 4:
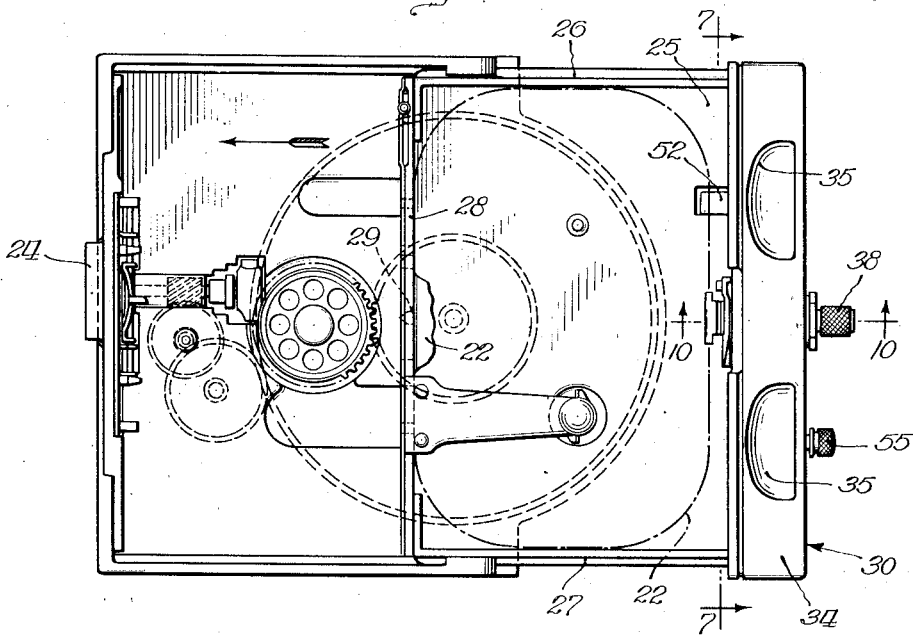
Fig. 4 is a view somewhat similar to Fig. 2, but with the view finder and the front and near side plates of the camera removed, the film magazine being shown diagrammatically by dotted lines except for a fragmentary portion thereof at its front edge.

Referring now to the several figures of the drawings, in which corresponding parts are indicated by the same reference characters, 15 indicates a camera comprising a casing portion 16 at one side for holding the film to be exposed and having a lens unit 17 mounted in position on its front fact as shown in Fig. 2. At the other side of the camera, a casing portion 18 is provided, being equipped with the motor and other operating means by which the movement of the film and the operating parts is effected. A view finder 19 of any suitable type is mounted in position above the casing portion 18, as is clearly shown in Fig.

1. The casing portion 16 comprises a removable face plate 20 at one side and a removable plate 21 at its front edge, such plates being removably mounted in position in any suitable manner.

Figure 5:
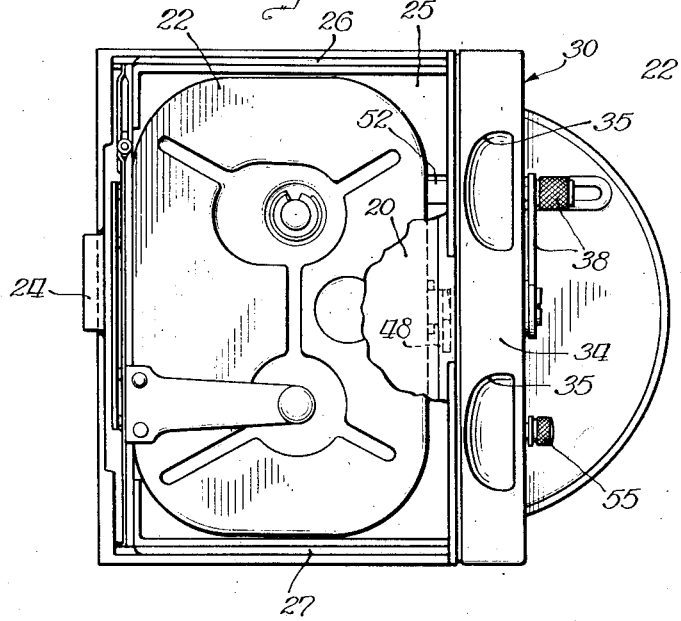
Fig. 5 is a view similar to Fig. 4, but with the carrier in its inner operative position, with the major portion of the magazine shown in solid lines, and with the greater portion of the near side plate broken away.
Figure 6:
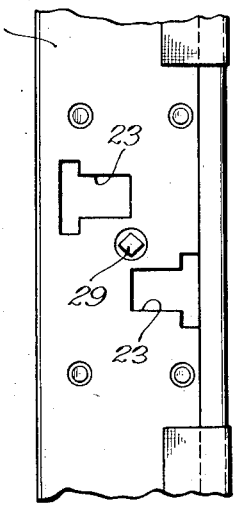
Fig. 6 is a front face view of a fragmentary portion of the film magazine.

The camera is of the type adapted to use a film magazine, such as the magazine 22 shown in Fig. 3 which is of well-known construction forming in and of itself no part of the present invention. The film magazine is equipped with a film wound upon a reel and threaded into position opposite to an exposure opening 23 as shown in Fig. 6, the end of the film beyond the exposure opening being connected with a rewinding reel or spool so that upon the rotation of the rewinding spool the film is drawn past the exposure opening 23. Certain parts of the operating mechanism are shown in Fig 4, but the same are not described herein, since the invention relates to other features of the camera. The lens unit 17 is carried by the front plate 21, being removed with such front plate in the arrangement shown in Fig. 4. The lens unit 17 has a telescopic fit with the projecting sleeve 24 of the camera as shown in Figs. 4 and 5.

In the arrangement disclosed, the film magazine 22 is supported in the magazine chamber provided by the casing portion 16 by means of a carrier movable into and out of the magazine chamber, the arrangement being substantially the same as that disclosed by the above mentioned co-pending application. The carrier is in the form of a drawer slidably mounted in the casing portion 16, the drawer being arranged to receive a film magazine 22 into gripped position therein, the magazine being entered transversely at one side face of the camera when the carrier is in its fully extended position as shown in Fig. 4. The present invention relates to certain improved means for positioning the magazine in the desired relationship in the carrier and for locking the carrier and the magazine in their normal operative position in the magazine chamber, together with novel means for ejecting the magazine from the carrier when it is to be removed from the camera.

In the arrangement as shown in the drawings, the camera is designed to handle 16 mm. film, the film being exposed along one side portion and then inverted and run a second time through the camera for exposure of the other side portion. This is indicated by the showing of two exposure openings 23 at opposite sides of the film magazine as shown in Fig. 6. This feature forms, however, no part of the present invention.

The carrier in the form of a drawer comprises a side face plate 25 and top and bottom plates 26 and 27, in the arrangement shown such plate portions being formed integrally with each other (see Fig. 7). At its front edge, the carrier is provided with a face plate 28 which is provided with a suitable opening therethrough for the reception of a tapered lug 29 extending from the front edge of the film magazine 22, as is best shown in Fig. 3. At its rear edge portion, the drawer comprises a channel bar 30 secured in position by means of plate portions 31 engaging the top and bottom walls 26 and 27, as shown in Fig. 9. The channel bar 30 is preferably in the form of a casting comprising a rear plate portion 32 and a forwardly disposed plate portion 33 connected together by an intermediate web portion 34, such web portion 34 being provided with depressions 35 therein for enabling the operator easily to grasp the drawer for moving it to its extended position. The space within the channel bar 30 between the plates 32 and 33 comprises an operating chamber for the operating means by which the film magazine is positioned and controlled, such chamber being closed at the open face of the channel by the wall plate 25.

Between the plates 32 and 33 of the channel bar, a short shaft 36 is rotatably mounted, such shaft extending a short distance beyond the plates 32 and 33 as is clearly shown in Figs. 10 and 11. On the inner end of the shaft 36, a head 37 is mounted, arranged so as to be swung through 90 degrees upon the shaft 36 by means of a crank handle 38 secured on the shaft at the outer face of the plate 32 (see Fig. 10). The arrangement is such that when the handle 38 is swung upwardly in the direction indicated by the arrow on the shaft 36 in Fig. 10, the crosshead 37 is swung to horizontal position, which is the operative position of the crosshead as is hereinafter described. When the handle 38 is swung downwardly and to one side in the direction indicated by the arrow on the shaft 36 in Fig. 11, the crosshead 37 is turned again to vertical position as shown in Fig. 10. At one side face, the shaft 36 is provided with a notch 39 in position to receive a spring 40 which normally presses against the flat face of the notch when the shaft is in the position as shown in Figs. 9 and 10 for holding the shaft releasably in such adjusted position. When the shaft 36 is turned by means of the handle 38 from the position shown in Fig. 10, the spring 40 is cammed out of engagement with the notch 39.

At the lower edge of the drawer, a heavy lug 41 is provided upon one end of which an arm or lever 42 is pivotally mounted by means of a machine screw 43. Such arm 42 extends upwardly into position opposite to the shaft 36, at which point the arm is provided with a lug 44 bent at right angles for effective engagement with a flat spring 45 mounted upon the wall portion 33, as is best shown in Fig. 9. The arrangement is such that the spring 45 normally holds the arm 42 pressed yieldingly forwardly.

At its upper end, the arm or lever 42 is provided with a second lug 46 also bent at an angle with respect to the arm, the lug 46 being obliquely positioned with respect to the arm, as is best shown in Figs. 10 and 11, so as to have slidable camming engagement with the rear edge portion of a film magazine 22 when being inserted into the drawer (see Fig. 10). When the magazine 22 is pressed transversely into position as shown in Fig. 11, the magazine is pressed forwardly by its engagement with the lug 46, the arrangement being such that the lug 46 is adapted to yield backwardly against the action of the flat spring 45 to the extent necessary for permitting the magazine to reach its operative position as shown in said Fig. 11. When the magazine 22 is in position in the carrier, the crosshead 37 may be turned from the vertical position as shown in Fig. 10 to the horizontal position as shown in Fig. 11, serving to bring a cam lug 47 on the front face of the head into latching engagement with the rear face portion of the lug 46 for locking the lug 46 positively in its forward position so as to prevent backward movement of the magazine 22.

In the use of the camera, the lever or handle 38 is normally left in its transversely extending position as shown in Fig. 10 until the magazine 22 is placed in position and the carrier has been pushed forwardly to its operative position in the magazine chamber of the camera, whereupon the handle 38 is moved upwardly for bringing the head 37 and lug 47 into positive locking position with respect to the parts. Under such circumstances, the opposite end of the head 37 from that at which the lug 47 is positioned is brought into engagement with a cooperating bearing on the wall of the magazine chamber of the camera. As is clearly shown in Fig. 11, the cooperating bearing is in the form of a notch or groove 48 in the inner face of the plate 20, the parts serving to hold the carrier and the film magazine mounted thereon positively in their operative position as shown in said Fig. 11.

For enabling an operator effectively to position the crosshead 37 in the predetermined operative and inoperative positions, a lug 49 is provided on the front face of the plate portion 33 of the channel 30, as is best shown in Fig. 7, adapted by engagement with the edge of the crosshead to limit its clockwise movement in said Fig. 7. When the handle 38 has been turned upwardly to its changed position as shown in Fig. 11, the lug 49 then engages the same edge of the crosshead 37 at a different point for limiting the movement of the head in counterclockwise direction in said Fig. 7.

The carrier for the film magazine 22 is arranged so as to have a fairly tight grip upon the film magazine so as to hold it firmly in the desired position in the camera. When the operator desires to remove the film magazine, the carrier is drawn first to its outermost position, made possible by a movement of the handle 38 to its transverse position as shown in Figs. 7 and 10. For expediting the removal of the magazine from the drawer, a lever or arm 50 is provided, pivotally mounted at an intermediate point by means of a collar 51 having a bearing on the shaft 36, as is best shown in Figs. 10 and 11. At its upper end, the lever 50 is provided with a forwardly extending lug 52 which extends through an opening 53 in the wall plate 33, as is best shown in Figs. 7 and 9. The lug 52 normally stands in an opening 54 in the housing plate 25 with the film magazine bearing against the inner face of the lug, as is best shown in Fig. 2. When the film magazine is to be removed, the lever 50 is given a movement in clockwise direction in Fig. 7 so as to release the magazine from the grip of the carrier by a partial movement out of position in the carrier. For actuating the lever 50, the lever is provided at its lower end with a handle 55 extending through a slot 56 in the wall plate 32 (see Fig. 8) into position for ready access from the outside of the camera.

By the use of my improved mechanism, an operator is enabled easily to insert a film magazine in a camera and to remove the magazine whenever desired. The means comprising the flat spring 45 and the lever 42 serves to press the magazine yieldingly forwardly on the carrier, the obliquely positioned lug 46 being arranged for displacing the lever 42 backwardly against the action of the spring 45 for permitting easy insertion of the magazine. When the lever 42 is in its forward position, with the crosshead 37 positioned horizontally, the head by engagement with the lug 46 holds the magazine positively against backward movement. When the magazine is to be removed from the camera, the carrier is moved to its outer position, whereupon a stroke of the lever 50 in clockwise direction in Fig. 7 to the position there shown forces the rear edge portion of the magazine toward the right for freeing the magazine from the grip of the carrier so as to permit the magazine easily to be grasped for removal.

By reason of the arrangement of the locking means comprising the shaft 36 and its cooperating parts, an operator is kept from overlooking the locking operation. With the handle 38 extending out beyond the face of the camera before a locking operation (see Fig. 3), the operator will normally be reminded of the necessity or desirability of effecting the locking operation, since the handle 38 under such circumstances is more or less in the way so as to interfere with the ordinary routine of taking pictures.

While the arrangement as shown and described is preferred, the invention is not to be limited to such construction and arrangement, except so far as the claims may be so limited, it being understood that changes might well be made in the arrangement without departing from the spirit of the invention.

I claim:

1. In a mechanism of the type described, the combination of a casing providing a magazine chamber, a carrier movable into and out of said chamber for moving a film magazine into and out of operative position therein, means comprising a cam movably mounted on said carrier adapted by engagement with a film magazine to press such magazine forwardly with respect to said carrier, and manually operable means for actuating said cam for moving the magazine forwardly.

2. In a mechanism of the type described, the combination of a casing providing a magazine chamber, a carrier movable into and out of said chamber for moving a film magazine into and out of operative position therein, an arm pivotally mounted on said carrier in position to swing into operative engagement with a film magazine on the carrier for pressing the film magazine forwardly, and resilient means on said carrier adapted by engagement with said arm to press such magazine yieldingly forwardly on the carrier.

3. In a mechanism of the type described, the combination of a casing providing a magazine chamber, a carrier movable into and out of said chamber for moving a film magazine into and out of operative position therein, means comprising a resilient member on said carrier adapted by engagement with a film magazine to press such magazine yieldingly forwardly on the carrier, and positively-acting means on said carrier adapted by engagement with said pressing means in cooperation with said resilient member to move the magazine to the limit of its movement forwardly on the carrier.

4. In a mechanism of the type described, the combination of a casing providing a magazine chamber, a carrier movable into and out of said chamber for moving a film magazine into and out of operative position therein, a member movably mounted on said carrier adapted by a forward movement in engagement with a film magazine to press the magazine forwardly on the carrier, yielding means on the carrier adapted normally to keep said movable member yieldingly at its forward position, and positively-acting means mounted on the carrier adapted by engagement with said movable member to move it to the limit of its movement forwardly on the carrier.

5. In a mechanism of the type described, the combination of a casing providing a magazine chamber, a carrier movable into and out of said chamber for moving a film magazine into and out of operative position therein, an arm pivotally mounted on said carrier in position to be displaced backwardly by engagement with a film magazine being inserted into the carrier, a spring bearing on said arm and normally holding the arm in its forward position on the carrier, and a member movably mounted on said carrier adapted by a movement manually into engagement with said arm at its extreme forward position to hold the arm against movement backwardly.

6. In a mechanism of the type described, the combination of a casing providing a magazine chamber, a carrier movable into and out of said chamber for moving a film magazine into and out of operative position in the chamber, an arm pivotally mounted on said carrier in position to engage a magazine on said chamber and to press it forwardly therein, and a member movably mounted on said carrier adapted by a movement into engagement with said arm to hold the arm positively against movement backwardly away from the magazine.

7. In a mechanism of the type described, the combination of a casing providing a magazine chamber, a carrier movable into and out of said chamber for moving a film magazine into and out of operative position therein, an arm pivotally mounted on said carrier in position to be displaced backwardly by engagement with a film magazine being inserted into the carrier, a spring bearing on said arm and normally holding the arm in its forward position on the carrier, and a member movably mounted on said carrier adapted by a movement manually into engagement with said arm to hold the arm positively against movement backwardly away from the magazine.

8. In a mechanism of the type described, the combination of a casing providing a magazine chamber, a carrier movable into and out of said chamber for moving a film magazine into and out of operative position in the chamber, an arm pivotally mounted on said carrier in position to engage a magazine in said chamber and to press it forwardly therein, a latching member movably mounted on said carrier adapted by a movement from an inoperative position into engagement with said arm in its forward position to hold the arm and the magazine against movement backwardly, and yielding means adapted when said latching member is in its inoperative position to hold the latching member releasably against movement out of said inoperative position.

9. In a mechanism of the type described, the combination of a casing providing a magazine chamber, a carrier movable into and out of said chamber for moving a film magazine into and out of operative position in the chamber, an arm pivotally mounted on said carrier in position to engage a magazine in said chamber and to press it forwardly therein, and operating means rotatably mounted on said carrier adapted by a partial revolution from its inoperative position into engagement with said arm in its forward position to hold the arm releasably against movement backwardly.

10. In a mechanism of the type described, the combination of a casing providing a magazine chamber, a carrier movable into and out of said chamber for moving a film magazine into and out of operative position in the chamber, an arm pivotally mounted on said carrier in position to engage a magazine in said chamber and to press it forwardly therein, operating means rotatably mounted on said carrier adapted by a partial revolution from its inoperative position into engagement with said arm in its forward position to hold the arm releasably against movement backwardly, and a spring adapted by engagement with said rotatable operating means when in inoperative position to hold said operating means releasably against movement out of said inoperative position.

11. In a mechanism of the type described, the combination of a casing providing a magazine chamber, a carrier movable into and out of said chamber for moving a film magazine into and out of operative position in the chamber, an arm pivotally mounted on said carrier in position to engage a magazine in said chamber and to press it forwardly therein, a head member rotatably mounted on said carrier so as to swing about an intermediate axis at right angles to the head adapted by a swinging movement into engagement with said arm in its forward position to hold the arm releasably against movement backwardly, means for giving said head member an operative stroke from its inoperative position, and yielding means opposing the movement of said head member from its inoperative position.

12. In a mechanism of the type described, the combination of a casing providing a magazine chamber, a carrier movable into and out of said chamber for moving a film magazine into and out of operative position therein, an arm pivotally mounted on said carrier so as to swing toward and from said magazine chamber, a lug on said arm extending transversely of the carrier in position to engage a magazine in said chamber and to press the magazine forwardly therein, and a head member rotatably mounted on said carrier so as to swing about an intermediate axis at right angles to the head adapted by a swinging movement into engagement with said lug in its forward position to hold the arm releasably against backward movement.

13. In a mechanism of the type described, the combination of a casing providing a magazine chamber, a carrier movable into and out of said chamber for moving a film magazine into and out of operative position therein, an arm pivotally mounted on said carrier so as to swing toward and from said magazine chamber and having a bearing face portion in oblique position with respect to the arm adapted by engagement with a film magazine being inserted into the carrier to displace the arm slightly backwardly, yielding means mounted on said carrier adapted normally to urge said arm forwardly, and a member movably mounted on said carrier adapted by movement into engagement with said arm in its forward position to hold the arm positively against movement backwardly away from the magazine.

14. In a mechanism of the type described, the combination of a casing providing a magazine chamber, a carrier movable into and out of said chamber for moving a film magazine into and out of operative position therein, an arm pivotally mounted on said carrier so as to swing toward and from said magazine chamber and having a bearing face portion in oblique position with respect to the arm adapted by engagement with a film magazine being inserted into the carrier to displace the arm slightly backwardly, yielding means mounted on said carrier adapted normally to urge said arm forwardly, and a head member rotatably mounted on said carrier so as to swing about an intermediate axis at right angles to the head adapted by a swinging movement into engagement with said arm in its forward position to hold the arm releasably against movement backwardly.

15. In a mechanism of the type described, the combination of a casing providing a magazine chamber, a carrier movable into and out of said chamber for moving a film magazine into and out of operative position therein, and means movably mounted on said carrier in position to engage a film magazine in said carrier and to hold the magazine pressed forwardly to operative position on the carrier and adapted by engagement with a portion of said casing to lock the carrier and the magazine releasably in operative position in said chamber.

16. In a mechanism of the type described, the combination of a casing providing a magazine chamber, a carrier movable into and out of said chamber for moving a film magazine into and out of operative position therein, an arm pivotally mounted on said carrier so as to swing toward and from said magazine chamber and having a bearing face portion in position for engagement with a film magazine in said carrier for applying forward pressure thereon, and a head member rotatably mounted on said carrier and held against movement backwardly on the carrier adapted to be rotated into engagement with said pivotally mounted arm in its forward position for holding the arm and the film magazine pressed forwardly to operative position on the carrier and adapted by engagement with a portion of said casing to lock the carrier and the magazine releasably in operative position in said chamber.

17. In a mechanism of the type described, the combination of a casing providing a magazine chamber, a carrier movable into and out of said chamber for moving a film magazine into and out of operative position therein, an arm pivotally mounted on said carrier so as to swing toward and from said magazine chamber, a lug on said arm transversely of the carrier with its front face positioned obliquely with respect to the arm adapted by engagement with a film magazine being inserted into the carrier to displace the arm slightly backwardly, yielding means mounted on said carrier adapted normally by engagement with said arm to urge the arm forwardly for applying pressure forwardly on said film magazine, and a head member rotatably mounted on said carrier and held against movement backwardly on the carrier adapted to be rotated into engagement with the back face of said lug in its forward position for holding the arm and the film magazine pressed forwardly to operative position on the carrier and adapted by engagement with a portion of said casing to lock the carrier and the magazine releasably in operative position in said chamber.

18. In a mechanism of the type described, the combination of a casing providing a magazine chamber, a carrier movable into and out of said chamber for moving a film magazine into and out of operative position therein, means movably mounted on said carrier in position to engage a film magazine in operative position in said carrier and to hold said magazine pressed forwardly, and means for moving said holding means toward and from operative holding position comprising an operating handle arranged to stand opposite to said casing when the holding means is in operative position and to extend transversely beyond the casing when the holding means is in inoperative position.

19. In a mechanism of the type described, the combination of a casing providing a magazine chamber, a carrier movable into and out of said chamber for moving a film magazine into and out of operative position therein, means movably mounted on said carrier comprising a head member rotatably mounted on said carrier and held against movement backwardly on the carrier adapted to be rotated into engagement with a film magazine in operative position in said carrier for holding said magazine pressed forwardly with respect to the carrier and adapted by engagement with a portion of the casing to hold the carrier pressed forwardly with respect to said casing, and means for moving said holding means toward and from operative position comprising a crank handle operatively connected with said rotatably mounted head and arranged so as to stand in substantially vertical position opposite to said casing when the holding means is in operative position and to extend transversely beyond the casing when the holding means is in inoperative position.

20. In a mechanism of the type described, the combination of a casing providing a magazine chamber, a carrier movable into and out of said chamber for moving a film magazine into and out of operative position therein, means movably mounted on said carrier comprising a head member rotatably mounted on said carrier and held against movement backwardly on the carrier adapted by pressure forwardly on a film magazine in operative position in said carrier to hold said magazine pressed forwardly with respect to the carrier and adapted by engagement with a portion of the casing to hold the carrier pressed forwardly with respect to said casing, and stop means mounted on said carrier in the path of movement of said head adapted by engagement with one edge of said head to limit the movement of the head into operative position and adapted by engagement with the same edge of said head at a different point therealong to limit the movement of the head into inoperative position.

PHILMORE F. SPERRY.